United States Patent [19]

Gustafsson

[11] 3,972,563

[45] Aug. 3, 1976

[54] SEATBACK TILT ADJUSTMENT MECHANISM

[76] Inventor: Gustaf Erik Gustafsson, Januarivagen 19, Vaxjo, Sweden, 352 47

[22] Filed: Sept. 4, 1975

[21] Appl. No.: 610,243

[52] U.S. Cl. ............................... 297/362; 16/139; 297/355; 297/374
[51] Int. Cl.² ..................... A47C 1/025; B60N 1/06
[58] Field of Search ........... 297/354, 355, 361, 362, 297/373, 374, 378, 379, 366; 16/139–141; 74/437, 393

[56] References Cited
UNITED STATES PATENTS

| 3,401,979 | 9/1968 | Putsch | 297/362 |
| 3,667,804 | 6/1972 | Yasui et al. | 297/362 |
| 3,737,946 | 6/1973 | Giuliani | 297/373 X |
| 3,823,440 | 7/1974 | Klingelhofer | 297/373 X |

FOREIGN PATENTS OR APPLICATIONS

| 1,555,711 | 10/1969 | Germany | 297/362 |
| 2,225,757 | 12/1972 | Germany | 297/366 |

Primary Examiner—Roy D. Frazier
Assistant Examiner—William E. Lyddane
Attorney, Agent, or Firm—Laff, Whitesel & Rockman

[57] ABSTRACT

A mechanism for adjusting the inclination of the seat backs of seats primarily for motor vehicles. The mechanism comprises two brackets, one connected to the base and the other connected to the seat back of a vehicle seat. Each bracket forms an integral structure and comprises a gear ring of internal teeth, said gear rings having the same diameters, with the number of teeth of the respective gear rings differing in number by a predetermined quantity. One or more gear wheels are movable in a planetary orbit inside the brackets and mesh with the teeth of the latter. Cover plates cover the teeth of said brackets and said gear wheel or wheels and mate with a corresponding recess or a corresponding raised portion, respectively. A shaft comprising the axis of rotation of the gear wheel penetrates the cover plates for making said plates rotative as a unit, with the two brackets being made rotative with respect to each other so that the seat back may be continuously adjusted with regard to the base portion of the seat.

5 Claims, 6 Drawing Figures

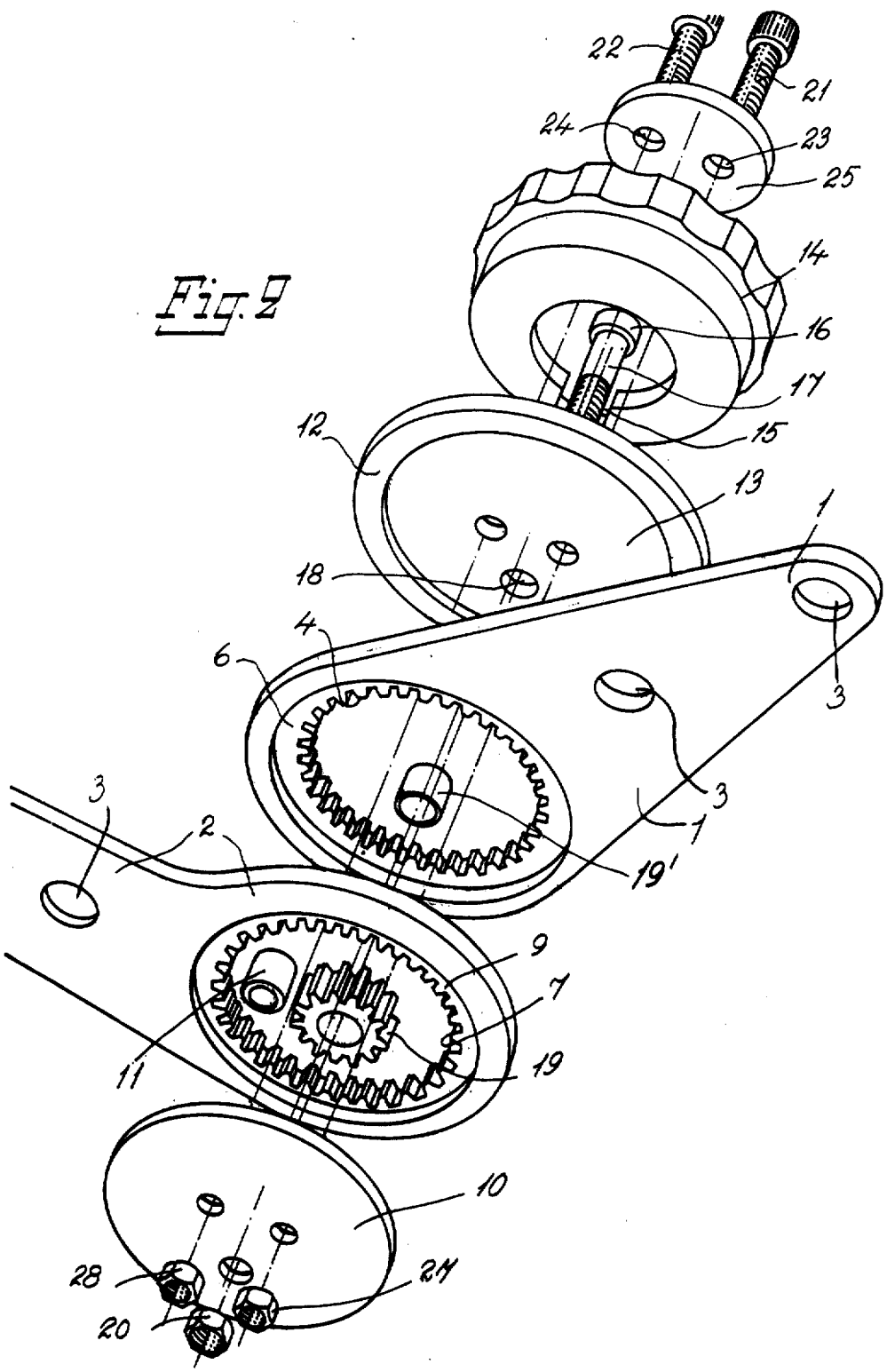

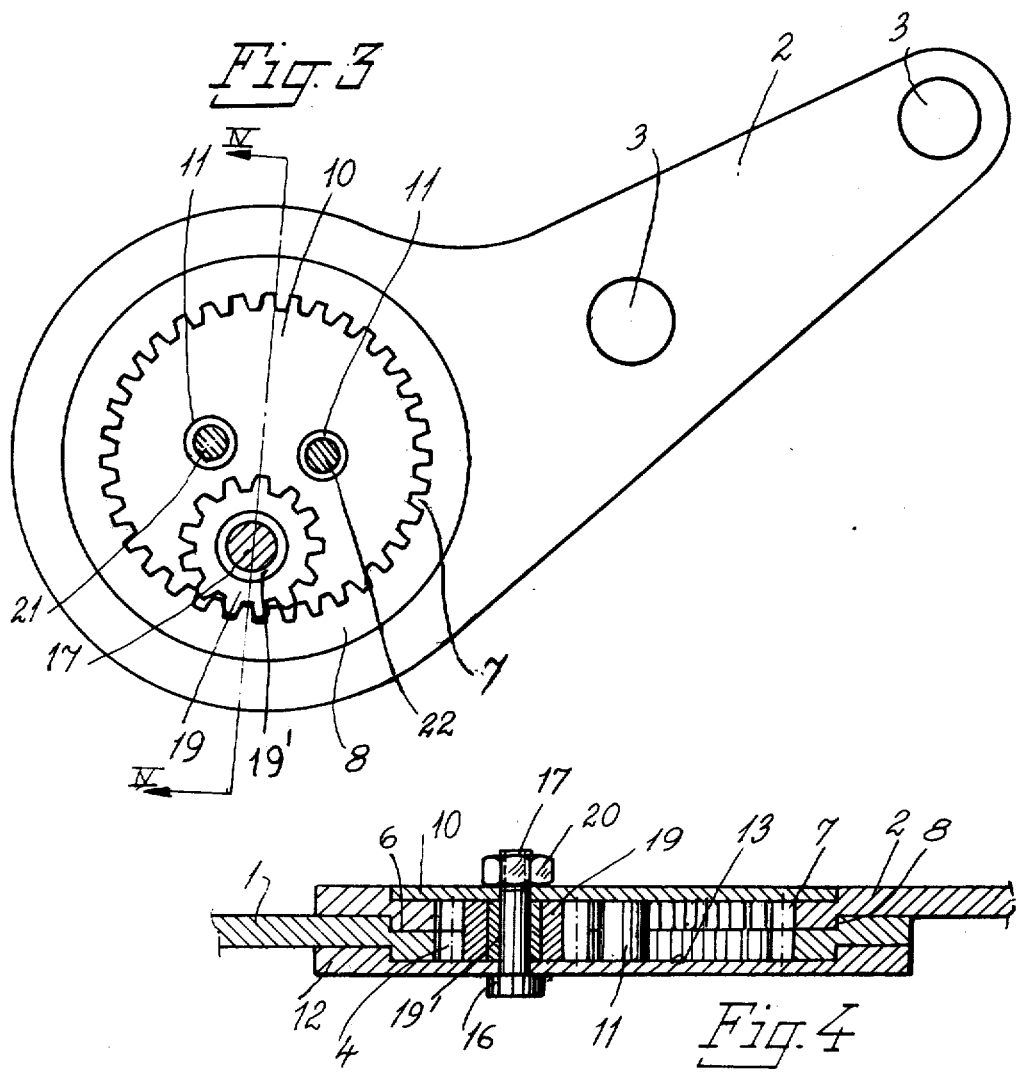

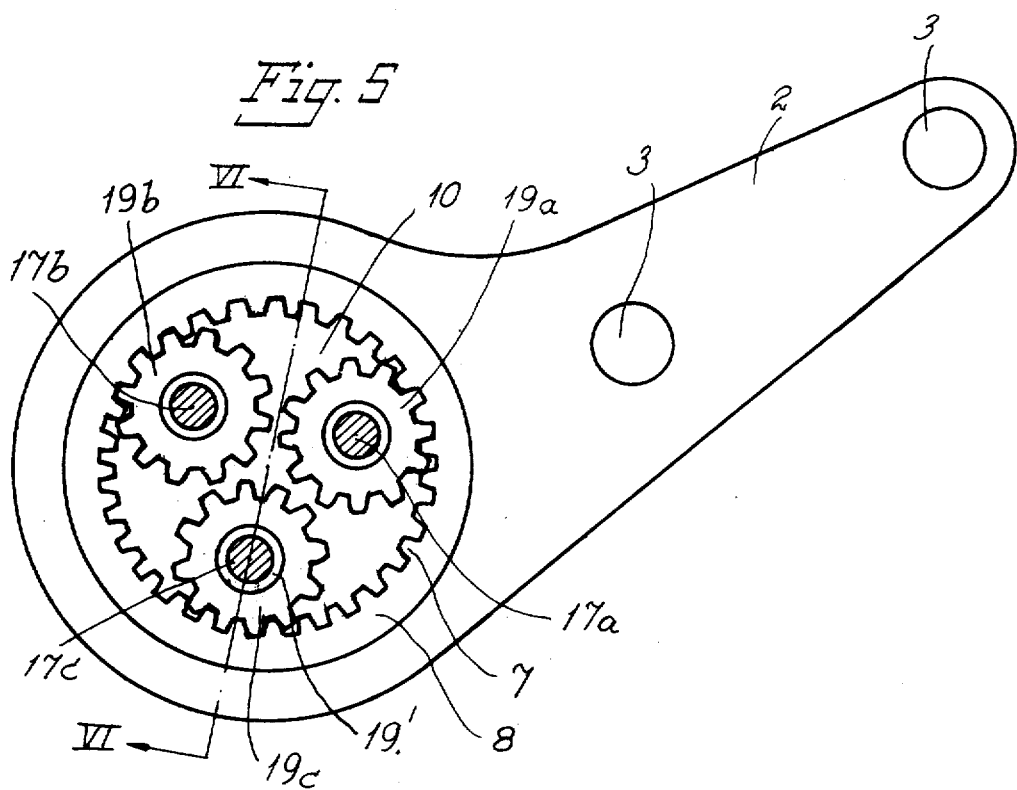
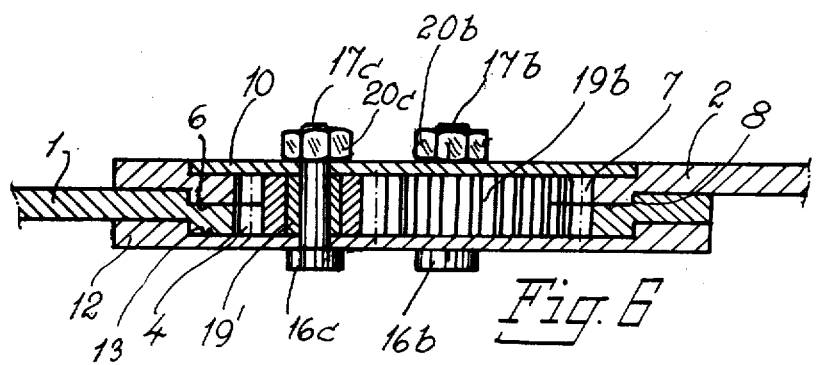

SEATBACK TILT ADJUSTMENT MECHANISM

BACKGROUND OF THE INVENTION

1. Field of the Invention

This invention refers to an adjustable mechanism, which primarily is intended to make it possible to adjust the inclination of the seat back of a motor vehicle seat but which also may be utilized in other connections.

2. Description of the Prior Art

A plurality of mechanisms for adjusting the inclination of the seat back of a motor vehicle seat are known. However, these known structures often have the disadvantage that they are complicated and hence expensive to manufacture. Furthermore, they may become defective in use, and thereby they do not fulfil the requirements of stability and the increasingly severe safety regulations, respectively, which are successively being established in various countries.

As an example of a mechanism of known type, mention may be made of the subject of invention of British Patent Specification No. 1,091,994, in which two gears, one having external teeth and the other having internal teeth, are made to mesh with each other. According to the solution provided by said British patent specification, one of the gears is mounted in such manner that it performs an eccentric movement with regard to the other gear, resulting in a relative rolling movement of the two gears so as to make the seat back of the motor vehicle seat move upwards and downwards, respectively, when the seat back is adjusted. Furthermore, the substantial number of components requiring accuracy in the British mechanism results in this mechanism being expensive to manufacture.

SUMMARY OF THE INVENTION

The object of the present invention is to disclose a continuously adjustable motor vehicle seat mechanism which may be manufactured at comparatively low cost and which is composed of merely a few components and is entirely reliable and moreover is blocked so as to prevent the seat back from folding over during the course of adjustment and in addition cannot be displaced from its set position even if the motor vehicle is subjected to a heavy impact, for example in connection with a collision.

In the mechanism in accordance with the invention which is primarily intended for motor vehicle seats and comprises a first bracket to be secured to one portion of the motor vehicle seat, for example the base or seat portion, and a second bracket cooperating with the first bracket for being secured to a second portion of the motor vehicle seat, i.e. the seat back, the first bracket forms an integral structure and comprises a gear ring of internal teeth. Furthermore the second bracket also forms an integral structure and comprises a gear ring of integral teeth of the same diameter as the gear ring of the first bracket. The first bracket is provided with a raised portion corresponding to a recess in the second bracket, so that the brackets may be mounted for rotative motion in each other, and the number of teeth of the first gear ring and of the second gear ring, respectively, differ by a predetermined quantity. At least one gear wheel having a substantially smaller diameter than said gear rings is movable in a planetary orbit inside of said gear rings and is mounted for meshing therewith. The two gear rings are covered by cover plates on their outsides, one of said cover plates fitting into a corresponding recess in the first bracket and the second plate covering the second gear ring by enclosing a raised portion thereof. The cover plates are secured to each other and are penetrated by a shaft comprising the axis of rotation of said gear wheel, and hence they are rotative as a unit so as to make the two brackets rotative with respect to each other for providing continuous adjustment of the seat back of the motor vehicle seat with regard to the base.

Contrary to the subject of invention disclosed by the above-mentioned British Patent Specification No. 1,091,994, the two gear rings and thus the two portions of the mechanism in accordance with the present invention will rotate around the same center of rotation.

As the result of the external diameter of the protruding gear ring of said one mechanism portion being chosen such, that this gear ring will fit into a corresponding recess in the second mechanism portion, the invention provides a mounting device having a large diameter, thereby creating a sturdy mounting having great strength.

BRIEF DESCRIPTION OF THE DRAWINGS

The invention will be described more specifically in the following with reference to the accompanying drawings, in which FIG. 2 shows an exploded view of the same mechanism as viewed from the other side, FIG. 3 is a plan view showing specific portions of the mechanism, FIG. 4 is a sectional view taken along the IV—IV of FIG. 3, FIG. 5 is a plan view similar to that of FIG. 3 but showing an embodiment with three gear wheels having smaller diameters instead of one single such gear wheel in FIG. 3, and FIG. 6 is a sectional view taken along the line VI—VI of FIG. 5. The same reference numerals have been utilized for identical portions in all of the figures.

DESCRIPTION OF THE PREFERRED EMBODIMENTS

Figure 1:
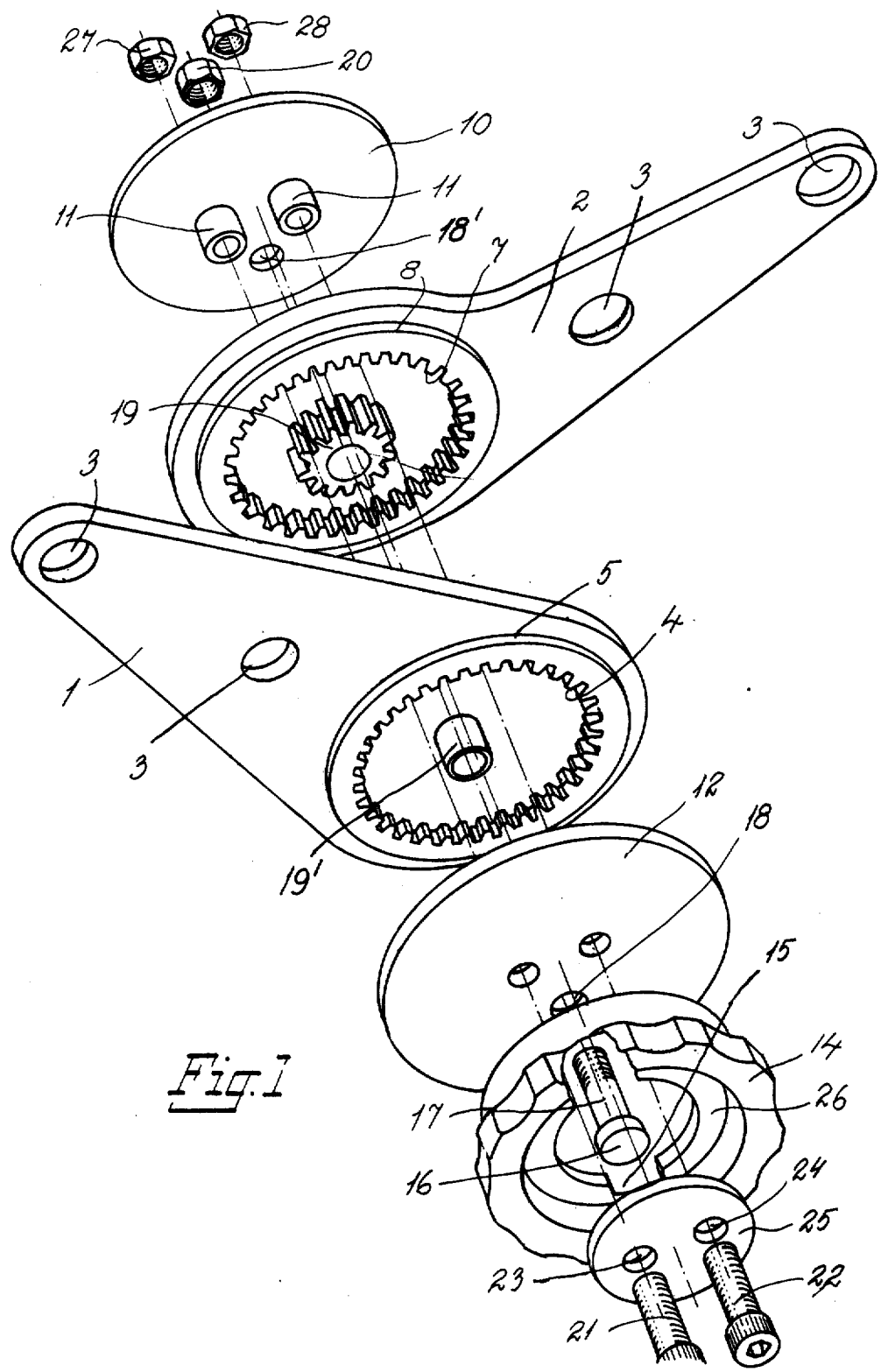
FIG. 1 shows an exploded view of the mechanism of the invention as viewed from one side.

The mechanism of the invention comprises two brackets 1 and 2, which are adapted to be secured to the seat back and the base, respectively, of a motor vehicle seat, for example by means of bolts being introduced through apertures 3 provided in said brackets.

As may be seen from the figures, bracket 1 includes a gear ring 4 of internal teeth, said gear ring forming a raised portion 5 (FIG. 1) on one side of bracket 1 and a recess 6 (FIG. 2) on the opposite side of said bracket. In similar manner, bracket 2 is provided with a gear ring 7 having a number of teeth deviating slightly from the number of teeth of gear ring 4. Bracket 1 may for example have 33 teeth, whereas bracket 2 may have 34 teeth. In the same manner as gear ring 4, gear ring 7 is raised at 8 on one side and is provided with a recess 9 on its other side. The raised portion 8 of bracket 2 fits into recess 6 of bracket 1, whereby the main portions of the two brackets will engage each other closely but not so closely that they cannot be rotated with regard to each other. This connection between the raised portion 8 of bracket 2 and the recess 6 of bracket 1 provides a reliable and sturdy mounting for the rotative motion of the two brackets 1 and 2.

A cover plate 10 is rotatively fit into recess 9 of bracket 2, said cover plate 10 being provided with two bushings 11 (FIG. 1), which may be secured to the plate or loosely disposed thereon and which serve as spacers between plates 10 and 12. In addition, cover plate 10 is provided with an aperture 18'.

The opposite side of bracket 1 from the side on which bracket 2 is located is provided with a cover plate 12 having a fairly large circular recess 13 whose diameter is chosen such, that the cover plate rotatively corresponds to the diameter of the raised portion 5, with the result that cover plate 12 will closely engage gear ring 4 when it is placed over said gear ring. The other side of cover plate 12, counted with respect to bracket 1, is provided with a knob 14 having a recess 15, into which the head 16 of a bolt 17 comprising a shaft fits. This bolt may be introduced through an aperture 18 in cover plate 12 and through a central aperture in an internal gear wheel 19 and furthermore through aperture 18' of plate 10. The teeth of gear wheel 19 are adapted to mesh with the teeth of the two gear rings 4 and 7 so that by rotating gear wheel 19 it becomes possible to make brackets 1 and 2 rotate with regard to each other, with the shaft of gear wheel 19, i.e. bolt 17, being displaceable in a planetary orbit inside of the two gear wheels 4 and 7, respectively. Compare FIG. 3, which shows a plan view of bracket 2, cover plate 10 engaging said bracket, the two spacers 11, and gear wheel 19 meshing with gear ring 7. If bracket 1 were to be superimposed on bracket 2 in its correct position, the diameters of gear ring 4 and gear ring 7 would conform with each other but the gear rings would be displaced by one whole tooth along the total circumference of the illustrated embodiment.

A nut 20 is intended for clamping bolt 17 in proper position for serving as a pivot for the small gear wheel 19.

In the embodiment illustrated in FIGS. 1–4, respectively, two bolts (screws or rivets) 21 and 22 are adapted for being introduced through apertures 23 and 24, respectively, in an external plate 25, which in turn fits into a recess 26 in knob 14 and with its flat bottom clamps the head 16 of bolt 17 to knob 14 and covers said head. Bolts 21 and 22, respectively, may be inserted further through the upper apertures of cover plate 12 and through brackets 1 and 2 as well as through bushings 11 so as to reach the nuts 27 and 28, respectively, by means of which said bolts may be secured. In this manner the assembled mechanism will form a unit in which brackets 1 and 2 may be rotated continuously with regard to each other so as to make it possible to adjust the inclination of the seat back (not shown) of a motor vehicle seat continuously with regard to the seat portion (not shown). In doing so, the seat back will remain in exactly the position that it occupies when knob 14 is released, and no additional blocking means are necessary for ensuring the set position of the seat back. The gear ratio of the small gear wheel 19 to gear rings 4 and 7 and the difference in the number of teeth of these gear wheels creates advantageous gearing and thereby the possibility of changing the inclination of the seat back by applying a moderate force to said knob 14. Smooth action is achieved concurrently, even if the seat back is loaded by the weight of a person sitting in the seat of the motor vehicle.

In order to distribute the forces between gear wheel 19 and gear rings 4 and 7, respectively, gear wheel 19 may be replaced by a plurality of gear wheels having the same diameters, for instance by three such gear wheels 19a, 19b, 19c, as is shown in FIGS. 5 and 6, with the two cover plates 10 and 12 being penetrated by a plurality of securing elements 17a, 17b, 17c, which may be provided with bushings, for example 19', forming bearings for the mentioned gear wheels having smaller diameters and being disposed radially from the centers of the cover plates 10, 12 for interconnecting the two plates so tightly that the two brackets 2 and 1 are effectively prevented from slipping apart as the result of uneven loads.

The mentioned securing elements may for example consist of bolts, rivets or other appropriate elements.

The invention is not limited to the embodiments described above and illustrated in the drawings, and these embodiments merely comprise examples of the invention and its utilization.

What is claimed is:
1. An adjustable mechanism for seats, primarily for motor vehicles, comprising
   a. a first bracket to be secured to one portion of said motor vehicle seat,
   b. a second bracket cooperating with said first bracket for being secured to a second portion of the motor vehicle seat,
   said first bracket forming an integral structure and comprising a gear ring of internal teeth and said second bracket also forming an integral structure and comprising a gear ring of internal teeth of the same diameter as the gear ring of the first bracket, with the number of teeth of the first gear ring and of the second gear ring, respectively, differing by a predetermined quantity,
   c. a raised portion on said first bracket,
   d. a recess in said second bracket,
   said recess corresponding to said raised portion of the first bracket, with said brackets thereby being capable of being monted for rotative motion in each other,
   e. at least one gear wheel having a substantially smaller diameter than said gear rings,
   said one gear wheel being movable in a planetary orbit inside of said gear rings and being mounted for meshing therewith,
   f. two cover plates for covering the two gear rings,
   one of said cover plates fitting into a corresponding recess of the first bracket and a second of said cover plates covering the second gear ring by enclosing a raised portion thereof, and
   g. a shaft comprising the axis of rotation of said gear wheel penetrating said cover plates for making said plates rotative as a unit,
   whereby the two brackets are rotative with respect to each other for providing continuous adjustment of the seat back with regard to the base portion of the seat.
2. A mechanism in accordance with claim 1, wherein said mechanism is provided with one single gear wheel of a substantially smaller diameter than said gear rings.
3. A mechanism in accordance with claim 1, wherein said mechanism is provided with three gear wheels of substantially smaller diameters than said gear rings.
4. A mechanism in accordance with claim 1, wherein one of said gear rings has one tooth more than the second gear ring.
5. A mechanism in accordance with claim 1, wherein the two cover plates are penetrated by a plurality of securing elements which concurrently form bearings for the mentioned gear wheels having smaller diameters and which are disposed radially from the centers of the cover plates for interconnecting the two plates so tightly that the two brackets are effectively prevented from slipping apart as the result of uneven loads.

* * * * *